US009363180B2

(12) United States Patent
Beliveau et al.

(10) Patent No.: US 9,363,180 B2
(45) Date of Patent: Jun. 7, 2016

(54) SERVICE CHAINING IN A CLOUD ENVIRONMENT USING SOFTWARE DEFINED NETWORKING

(71) Applicant: TELEFONAKTIEBOLAGET L M ERICSSON (PUBL), Stockholm (SE)

(72) Inventors: Ludovic Beliveau, St-Constant (CA); Catherine Truchan, Lorraine (CA); Suresh Krishnan, Johns Creek, GA (US)

(73) Assignee: TELEFONKATIEBOLAGET L M ERICSSON (PUBL), Stockholm (SE)

( * ) Notice: Subject to any disclaimer, the term of this patent is extended or adjusted under 35 U.S.C. 154(b) by 192 days.

(21) Appl. No.: 14/161,261

(22) Filed: Jan. 22, 2014

(65) Prior Publication Data
US 2015/0124815 A1 May 7, 2015

Related U.S. Application Data

(60) Provisional application No. 61/899,687, filed on Nov. 4, 2013.

(51) Int. Cl.
| | | |
|---|---|---|
| *H04L 12/801* | (2013.01) | |
| *H04L 12/743* | (2013.01) | |
| *H04L 12/721* | (2013.01) | |
| *H04L 12/851* | (2013.01) | |

(52) U.S. Cl.
CPC ............ *H04L 45/7453* (2013.01); *H04L 45/38* (2013.01); *H04L 47/24* (2013.01)

(58) Field of Classification Search
None
See application file for complete search history.

(56) References Cited

U.S. PATENT DOCUMENTS

| | | | | |
|---|---|---|---|---|
| 7,131,141 | B1 * | 10/2006 | Blewett | ............... H04L 63/0209 709/223 |
| 7,860,100 | B2 | 12/2010 | Khalid et al. | |
| 2005/0289244 | A1 * | 12/2005 | Sahu | ................... H04L 67/2819 709/249 |
| 2010/0080226 | A1 | 4/2010 | Khalid et al. | |
| 2011/0055845 | A1 | 3/2011 | Nandagopal et al. | |
| 2013/0272305 | A1 | 10/2013 | Lefebvre et al. | |

OTHER PUBLICATIONS

PCT International Search Report from corresponding application PCT/IB2014/058678.
Network Functions Virtualisation, Introductory White Paper, Oct. 22-24, 2012 at "SDN and OpenFlow World Congress", Darmstadt-Germany, pp. 1-16.
ONF Open Networking Foundation, OpenFlow Switch Specification, Version 1.3.2 (Wire Protocol 0x04), Apr. 25, 2013, pp. 1-131.
Nick McKeown et al., OpenFlow: Enabling Innovation in Campus Networks, Mar. 14, 2008, pp. 1-6.
ONF Open Networking Foundation, Software-Defined Networking: The New Norm for Networks, ONF White Paper, Apr. 13, 2012, pp. 1-12.

(Continued)

*Primary Examiner* — Alex Skripnikov

(57) ABSTRACT

A system and method for steering traffic through a set of services is provided. A service path or service chain is assigned to a received packet based on a classification of the packet and correlation of the packet with a traffic flow. A new service chain identifier can be created if no such correlation exists. A next service type and a particular instance of the next service type can be determined in accordance with the service chain identifier. A next destination for the traffic can be set in accordance with the instance of the next service.

22 Claims, 10 Drawing Sheets

(56) References Cited

OTHER PUBLICATIONS

NXAST_LEARN Specification, http://git.openvswitch.org/cgi-bin/gitweb.cgi?p=openvswitch;a=blob;f=include/nicira-ext.h, Downloaded Jun. 10, 2014, pp. 1-38.

ICCLAB, OpenFlow—Setting up a Learning Switch; www.cloudcomp.ch/2012/10/openflow-setting-up-a-learning-switch/, Oct. 10, 2012, pp. 1-8.

Cisco, White Paper, Enabling Service Chaining on Cisco Nexus 1000V Series, 2013, pp. 1-25.

* cited by examiner

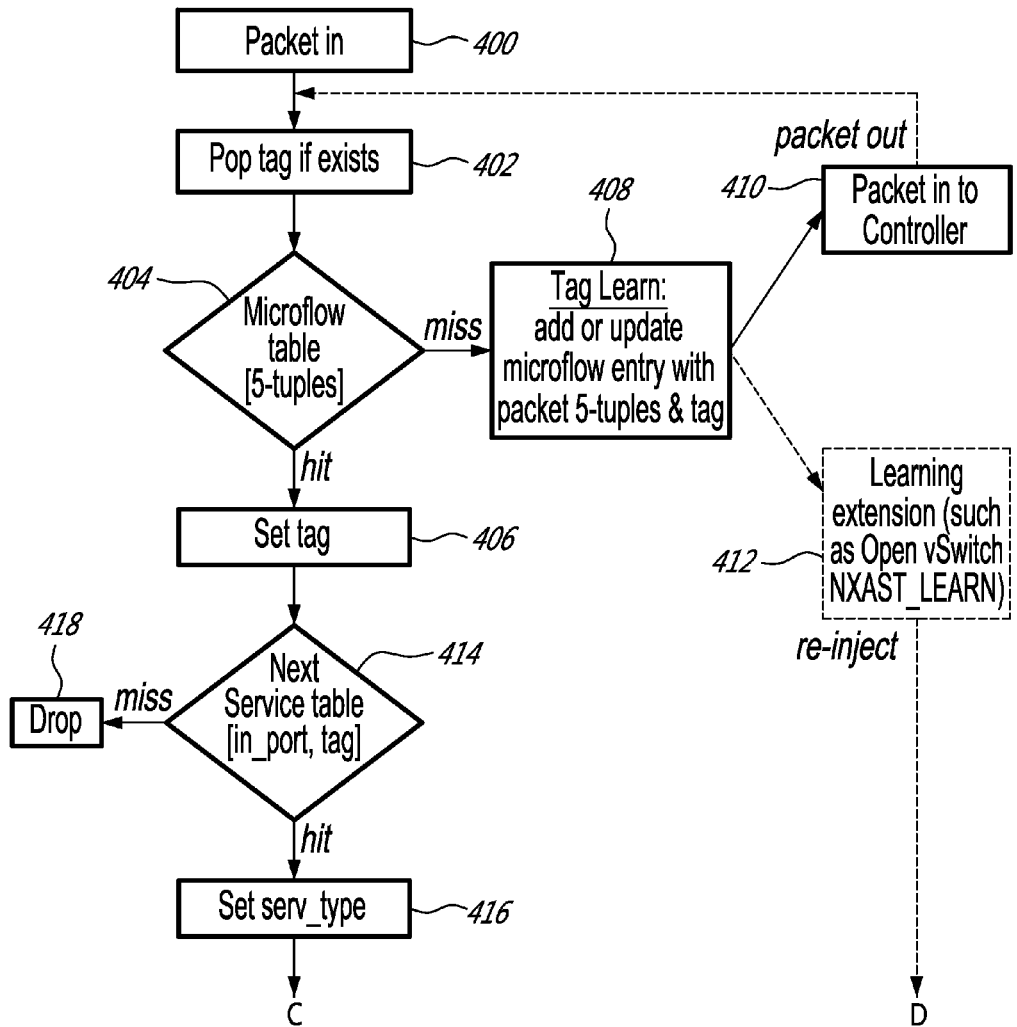

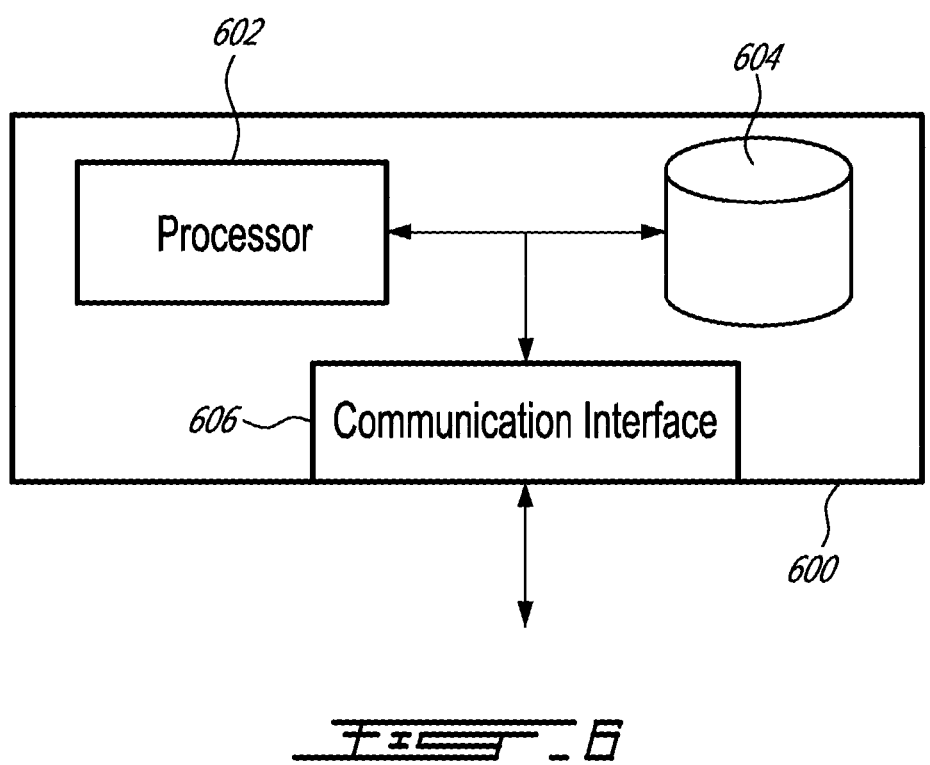

SERVICE CHAINING IN A CLOUD ENVIRONMENT USING SOFTWARE DEFINED NETWORKING

CROSS-REFERENCE TO RELATED APPLICATIONS

This application claims the benefit of U.S. Provisional Application No. 61/899,687 filed on Nov. 4, 2013 the contents of which are hereby incorporated by reference.

TECHNICAL FIELD

This description relates generally to systems and methods for steering packet traffic through a service chain using Software Defined Networking.

BACKGROUND

The use of packet-based networking has been growing over time and the growth in traffic demands is increasingly being met by introducing ever larger monolithic routers. However, this model is approaching its technologic and economic limits. It is more and more difficult to fulfill the increasing demand for bandwidth with traditional router designs, and with the emergence of low cost Commercial Off-The-Shelf hardware, router vendors also have difficulty justifying higher costs for the same performance. At the same time, the demands on the routing and switching control plane in the access and aggregation networks are becoming more complex. Operators want the ability to customize packet delivery to handle specific kinds of traffic flows without the detailed low-level configuration typical of today's networks.

These trends suggest a different approach to the network architecture, in which the control plane logic is handled by a centralized server and the forwarding plane consists of simplified switching elements "programmed" by the centralized controller. Software Defined Networking (SDN) is a new network architecture that introduces programmability, centralized intelligence and abstractions from the underlying network infrastructure.

OpenFlow is an open standard protocol between the control and forwarding planes used in SDN applications. As shown in FIG. 1, in this model a control platform 100, running on one or more servers 102, 104 in the network, manages a set of switches 108a-108e having only basic forwarding capabilities through a network operating system (OS) 106. The control platform 100 collects information from the switches 108a-108e and operator configuration and then computes and distributes the forwarding rules to them. A logically centralized controller can more easily coordinate the state among the various switching platforms and provides a flexible programmatic interface to build various new protocols and management applications. This separation significantly simplifies modifications to the network control logic (as it is centralized), enables the data and control planes to evolve and scale independently, and potentially decreases the cost of the forwarding plane elements.

OpenFlow was initially designed for Ethernet-based forwarding engines, with internal flow-tables and a standardized interface to add and/or remove flow entries. An example OpenFlow switch 110 is illustrated in FIG. 2 as consisting of three major components: the flow tables 112a-112x, a secure channel to the control process 114, and the OpenFlow protocol 116.

The flow tables 112a-112x specify how the switch 110 should process packets, with an entry of actions associated with each flow. Packets can be pipelined through the flow tables 112a-112x in a specified order. The Secure Channel 114 connects the switch to a remote control process, e.g. a controller 118, for communications and packet forwarding between the controller 118 and the switch 110. The OpenFlow protocol 116 provides an open and standard method for an OpenFlow switch 110 to communicate to a controller 118. A Group Table 120 is illustrated as a special type of table to be used for more complex types of forwarding (broadcast, multicast, failover, hashing, etc.). Packets can first pass through the flow tables 112a-112x and an entry may specify an action to direct the packet to a specific entry in the group table 120.

The controller 118 can communicate with the switching elements, including switch 110, using the OpenFlow protocol 116. The controller 118 hosts simplified network applications which can compute the rules and push the corresponding forwarding instructions to the switching elements. This architecture allows the controller 118 to run on a separate server and control multiple switches, rather than having a distributed control plane with components that run on each switch (e.g. Spanning Tree Protocol (STP), Open Shortest Path First (OSPF), etc.).

Operators use different middlebox services, called inline services, such as deep packet inspection (DPI), logging/metering/charging/advanced charging, Firewall, Intrusion Detection and Prevention (IDP), Network Address Translation (NAT), and others to manage subscriber traffic. An inline service that identifies a packet to potentially alter it by encapsulating it, marking it, or blocking it, is also called a "high-touch" service or function (e.g. DPI). These services have high requirements on throughput and packet inspection capabilities. Inline services can be transparent or non-transparent (e.g. content filtering) to the end users.

Inline services can be hosted on dedicated physical hardware, or in virtual machines (VMs). Lightweight services such as NAT can potentially be incorporated into the switching domain in order to minimize the number of hops the traffic is subjected to.

Service chaining is required if the traffic needs to go through more than one inline services. If more than one chain of services is possible, then the operator needs to configure the networking infrastructure to direct the right traffic through the right inline service path. In this description, "traffic steering" refers to leading the traffic through the right inline service path. We say that an inline service is transparent when a service is not explicitly addressed by the user. Therefore the end user might not be aware that its traffic may traverse a series of network services. It is assumed that the service will not modify the L2/L3 packet headers.

Conventional solutions provide service chaining of a single instance of a physical hardware box for a given inline service. Current solutions use private mechanisms or error-prone manual configuration of the network (for example virtual local area network (VLAN), policy-based routing (PBR), etc.), hence forcing vendor lock-in to the operator. The use of vendor-specific mechanisms also means that the inline services need to be supplied by the vendor of the chaining infrastructure. The feature velocity that operators often desire can be greatly reduced. Operators are looking for an infrastructure where they can mix and match different components (both software and hardware) from numerous vendors in their network. Using open interfaces also has the benefit of lowering operating expenses by easing the configuration of the network and its nodes.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for steering packet traffic. The method includes receiving a packet on an ingress port. Responsive to determining there is an entry corresponding to the packet stored in a microflow table, the packet is correlated with a service chain identifier. A next service type is determined for the packet in accordance with the service chain identifier and the ingress port. An instance of the next service is selected in accordance with the determined next service type. The packet is forwarded to the selected instance of the next service.

In an embodiment of the first aspect, responsive to determining that the received packet has an associated service chain tag, the service chain tag is removed from the packet.

In another embodiment, the service chain identifier is stored in metadata associated with the packet.

In some embodiments, the instance of the next service is selected in accordance with a load balancing algorithm, at least one parameter associated with the packet, and/or a non-packet parameter.

In another embodiment, a destination address of the packet is set in accordance with the selected instance of the next service. An egress port can be selected in accordance with the selected instance of the next service. In response to determining that the egress port is a transit port, a service chain tag can be attached to the packet.

In another embodiment, responsive to determining there is no entry corresponding to the packet stored in the microflow table, a new entry is created in the microflow table. A new service chain identifier can be assigned to a traffic flow associated with the packet.

In a second aspect of the present invention, there is provided a switch comprising a communication interface, a processor, and a memory, the memory containing instructions executable by the processor. The switch is operative to receive a packet on an ingress port of the communication interface. Responsive to determining there is an entry corresponding to the packet stored in a microflow table, the packet is correlated with a service chain identifier. A next service type is determined for the packet in accordance with the service chain identifier and the ingress port. An instance of the next service is selected in accordance with the next service type. The packet is forwarded to the selected instance of the next service by the communication interface.

In another aspect of the present invention, there is provided a forwarding element comprising at least one ingress port, a microflow table module, a next service table module, a load balancing table module, and at least one egress port. The ingress port is configured for receiving a packet. The microflow table module is configured for correlating the packet with a service chain. The next service table module is configured for determining a next service type for the packet in accordance with the service chain and the ingress port. The load balancing table module is configured for selecting an instance of the next service in accordance with the determined next service type. The egress port is configured for forwarding the packet towards a destination address associated with the selected instance of the next service.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 6 illustrates an example switch.

DETAILED DESCRIPTION

The present disclosure is directed to a system and method for steering traffic through a set of services.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

In a service network, an operator is able to define service policies that specify traffic classes and the chain of services that each class must traverse. These policies are translated by the controller into rules that are programmed on the switches in the service network. These rules steer the network traffic through the chain of services specified by the policies.

Embodiments of the present disclosure provide a programmable infrastructure with the necessary mechanisms to chain inline services within a cloud computing environment. A packet is first encapsulated in a tunnel to be transported to a data center. The infrastructure can include load balancing over multiple instances of an inline service type. It can also address classifying the packets based on the service chaining policies.

Embodiments of the present disclosure are directed towards providing service chaining of subscriber traffic in a cloud environment where there are multiple virtual instances of a given inline service. Conventionally, inline services are typically provided using dedicated hardware, which is both expensive and not scalable. Breaking apart such services into multiple components and running them in a data center environment inherently provides many benefits including elasticity, higher flexibility and reduction in capital expenditure to more uniform hardware platforms.

Embodiments of the present disclosure involve tunneling traffic from the access network up to a data center and accurately steering the traffic between the multiple virtualized inline services that constitute the service path. Since multiple instances of a given service are deployed in the date center, load balancing functionality is provided within the infrastructure to split the traffic and maintain flow affinity (i.e. packets from the same flow will always pass through the same instance of a service).

Some embodiments will be described as using the OpenFlow protocol, but can also be implemented with other types of Software Defined Networking (SDN) protocols. Open- Flow is a communications protocol that gives access to the forwarding plane of a network switch or router over the network.

Figure 1:
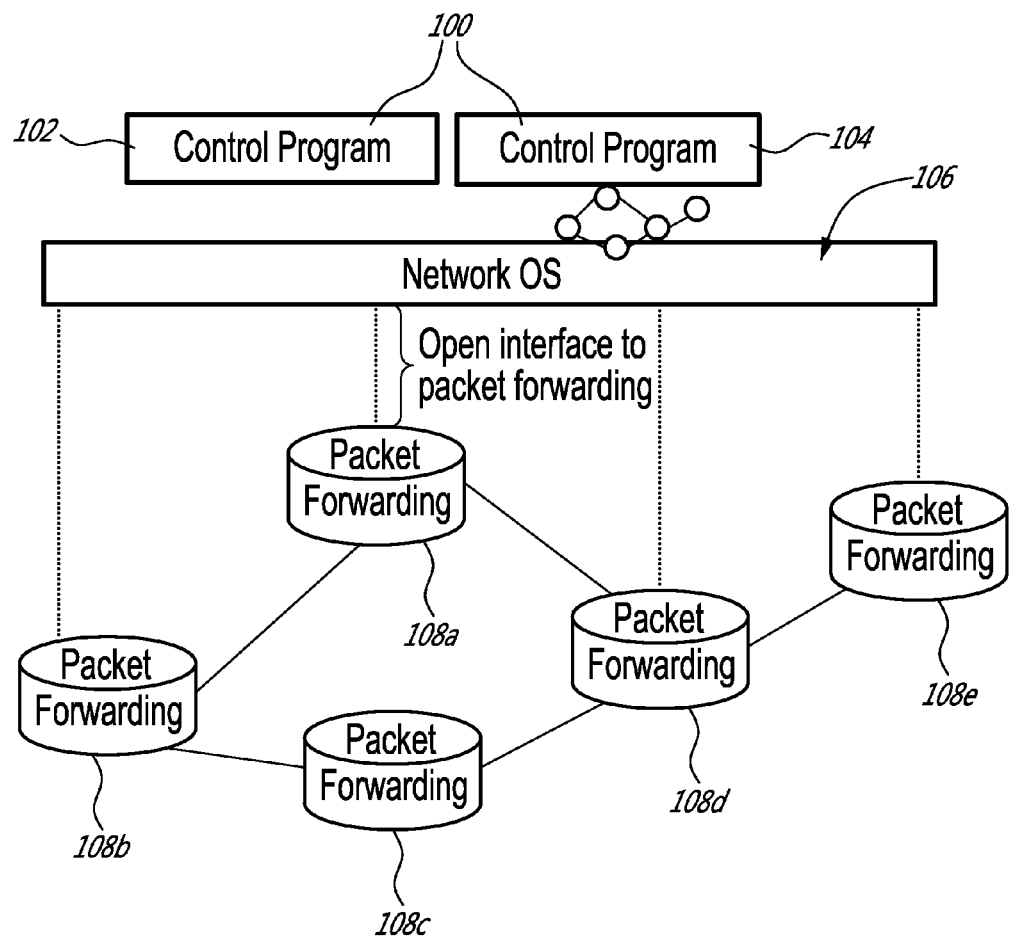
FIG. 1 is a software defined networking architecture diagram.
Figure 2:
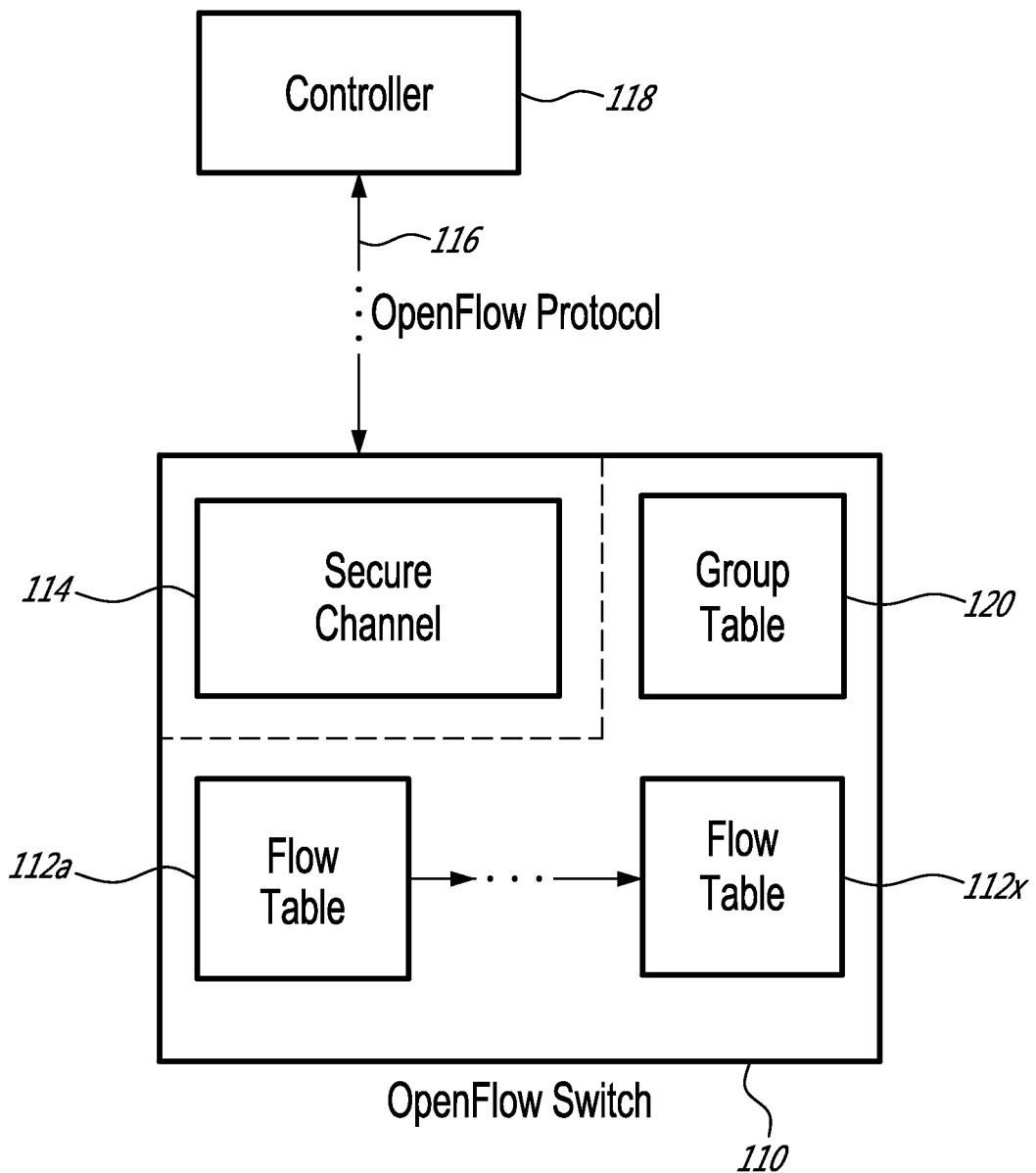
FIG. 2 is an OpenFlow architecture diagram.
Figure 3:
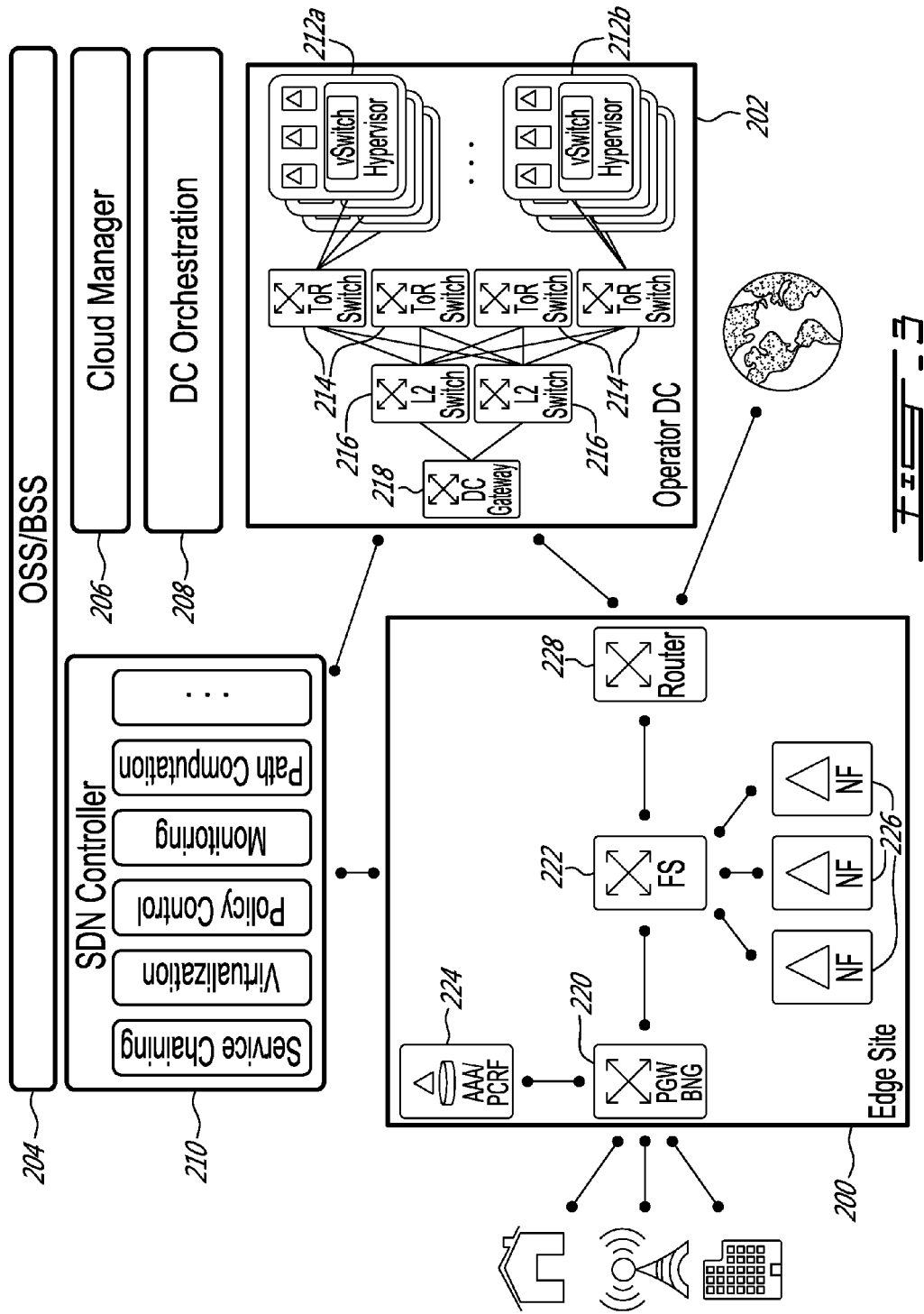
FIG. 3 is a network overview diagram.

FIG. 3 illustrates a network overview of an exemplary embodiment of the present disclosure and its different components. The overall system supports the inclusion of dedicated (i.e. legacy) hardware boxes running inline services, but this description will focus on the data plane aspect between the operator's access networks up to the data center running the different virtual inline services. An Edge Site 200 and an Operator Data Center 202 are shown, with management functions including Operations Support System/Business Support System (OSS/BSS) 204, Cloud Manager 206, Data Center Orchestration manager 208 and SDN Controller 210. The OSS/BSS 204 provides operation and business logic. The Cloud Manager 206 issues virtualization and other commands. DC Orchestration 208 provides virtual resource spin-up, compute, storage, etc. instructions based on the Cloud Manager 206 commends. The SDN Controller 210 distributes packet forwarding rules to the various switches as has been previously discussed herein. The SDN Controller 210 can host one or more applications including service chaining, virtualization, policy control, monitoring, and path computation.

In the Operator Data Center 202, a virtual inline service can be hosted in a VM, or multiple VMs, hosted on a server or blade 212a. Server 212a can also include a virtual switch and a hypervisor. Multiple virtual inline services can share the resources of the same physical server. A rack typically consists of a number of servers 212a-212b and a top of rack (TOR) switch 214. Multiple racks can be connected together using a mix of switches and routers, for example L2 Switches 216 and Data Center Gateway switch 218.

It is assumed that an instance of a virtual software switch is included in the server 212a for handling the communication between multiple VMs running on the same server, as well as VMs running on external servers. Other methods can be similarly used for this purpose, for example, remote port is a method to offload the switching to a hardware switch. A particular virtual inline service can be running on a dedicated server, either bare metal or using an operating system.

The user traffic (fixed or mobile) is ultimately terminated by a gateway node 220 (e.g. a Border Network Gateway (BNG), or Packet Data Network Gateway (PGW)). If the gateway node 220 itself does not support SDN, one or more Flow Switches (FS) 222 can be directly attached to the gateway 220. Flow Switch 222 can be an OpenFlow Switch capable of steering packet traffic flows. Edge Site 200 can further include a policy controller 224, various network functions (NF) 226 (e.g. Network Address Translation (NAT), firewall, etc.) and router 228.

Flow Switch 222 is programmed by the SDN Controller 210 to implement service chaining logic. Multiple tables and actions are used to classify the packets according to the policies specified by the operator, which will identify which service chain/path a particular flow is supposed to take. Policies can include per subscriber traffic or per application traffic (YouTube, etc.) for example. A flow represents a subset of user traffic that follows the same conditions according to the packet headers over a given period of time. A certain number of tuples is used to identify a flow (for example IP source, IP destination, TCP source, TCP destination, etc.). A particular header field can also be "wild-carded" to identify an aggregation of traffic.

Once a service chain has been identified for a particular packet or flow, a tag representing that path can be inserted in the packets that need to traverse the identified chain. This solution is suitable in the presence of a plain L2 solution, as well as an L2 over L3 solution (like Virtual Extensible LAN (VXLAN), Network Virtualization using Generic Routing Encapsulation (NVGRE), Stateless Transport Tunneling (STT), etc.) but other methods are not excluded. The packets are then sent over the network and will ultimately reach an edge router connected to an L3 domain (public or private).

Some embodiments of the present disclosure are based on a hop-by-hop decision. That is, each hop is responsible for identifying the next service instance in the chain. Other alternative embodiments can employ an approach where all the service instances that the traffic will follow are decided at the first hop. In some instances the hop-by-hop approach may be more scalable and more responsive to events that can occur in the network (e.g. reconfiguration, link failure, etc.). The SDN Controller 210 is responsible for creating/deleting instances of a particular virtual inline service and each hop (chain forwarder) then has the information on how to load balance among the subset of the next service type.

Embodiments of the present disclosure can support multiple instances of a given inline service. This can be supported by either having each of the multiple service instances represented as a different service type or, alternatively, by using a load balancing scheme that will enable smooth handover of traffic from an old to a new version. The latter may be more complicated, but may also be necessary when it is necessary to switch traffic to a state-full service without losing traffic or in-service up time.

The L2oL3 (Layer 2 over Layer 3) tunnel is terminated in the Operator Data Center 202, and the L2/Ethernet destination is used to forward the packets to the particular server/VM that is running the first inline service in the service chain. The virtual switch running on the hypervisor receives the packet and sends it to the corresponding VM. The virtual switch will then receive the packet from the VM and must determine where the packet should go next.

It will be appreciated by those skilled in the art that an exemplary embodiment for the upstream traffic will be explained but the same logic can apply for the downstream traffic as well.

Embodiments of the present invention provide an infrastructure where a given service does not have to be modified in order to be deployed. That is, it can be unaware of the service chaining mechanism. This aspect is an enabler to easily deploy a maximum number of applications. Other solutions could use a proprietary header, for example, to store the context of the packet. But a given service would then need to be modified in order to be able to parse the packet and preserve the proprietary header.

Another aspect considered by the present invention is that a switch has to correlate packets that are sent to a VM with the packets that come back from that same VM. This correlation of packets can be required in order to know at which point in the service chain the packet is currently located, and to subsequently identify where the packet should go next. The next destination can be another VM on the same server, a VM on another server or the packet may have reached the end of the service chain and should exit the data center and continue to its final destination.

A simple solution would be to reclassify the packet based on its headers and the policies, but this could have a severe impact on performance (throughput and latency) because of the limited capacity of a general purpose server to do such lookups as compared to network equipment that has specialized hardware to process packets (such as Ternary content-addressable memory (TCAM)). Difficulties reside in classifying a packet using wild card rules in software using DRAM memory at wire speed. The MAC address could potentially be encoded for storing the service path ID, but this method may be too restrictive if some of the inline service implementations actually modify the Ethernet header.

In an embodiment of the present invention, a certain number of fields from the packet are stored or cached in a table that will be referred to as the Microflow table. In one example, five fields are stored: IP source address, IP destination address, source port, destination port, and protocol. This specific set of fields is commonly referred to as a 5-tuple. An entry corresponding to the first packet of a flow is inserted in the table by either the controller (on a miss table lookup) or, in a more optimized way, by using a learning extension (protocol extension) by the switch. Therefore the slow packet punting to the controller can be avoided and is executed in the data path. All of the subsequent packets for that flow will then result in a successful match in the Microflow table. Each Microflow table entry can optionally also be associated with a timeout value in order to delete any stale entries (i.e. flows that are no longer active). One possible optimization would be to recognize TCP FIN packets to tear down the flows. Deleting stale entries is beneficiary to avoid using all available memory.

Load balancing is advantageous for the purpose of assigning a new flow to a specific instance of an inline service (e.g. a specific VM). It is important to maintain flow affinity because a given service is more than likely to maintain state for flow. Therefore it is desirable that all the packets of a flow go to the same service instance (in both the upstream and downstream directions). In theory, a flow can be first assigned to a service instance and this information can be stored in the data path for subsequent packets. In practice, this step can be avoided by partitioning the traffic over the services by using a hash function based on the subscriber identity (source IP address in the upstream, destination IP address in the downstream). A hash function can be selected that will provide an even distribution in order to reach balanced usage of resources (VMs). A simple CRC32 can be used for example, and a person skilled in the art will appreciate that a configurable method for defining and programming the hashing function can be employed.

In one embodiment, the OpenFlow group table with entries of type "select" is used to load balance the traffic. Each entry (group ID) represents a service type. A "select" group entry contains a certain number of buckets where each bucket is assigned one or more actions and a given bucket is selected using our hash function. A bucket represents the next hop instance of a service. The action of a bucket can be configured in such a way to correctly transport the packet to a VM. The possibility of providing redundancy for one or more service instances where traffic is redirected to the backup VM is also included, in case of failure of the active VM. The synchronization of these VMs will not be discussed, but will be readily understood by those skilled in the art.

There are multiple cases of "next destination" for a packet, including: Local VM (on the same server), Remote VM (on another server in the same data center) and VM in a remote data center. For Local VM, the action is then to "output" the packet to the port corresponding to the VM. For Remote VM, the action is set in the destination MAC address in the Ethernet header. For VM in a remote data center, the action is to encapsulate the packet with an L2oL3 header or send it to a node that will do the same.

The group table can be programmed by the SDN Controller based on knowledge of the location of the VMs.

The present disclosure has not explicitly discussed that a VM can be down, migrated to another server, or that an instance of a service can be added or removed (scale-in/scale-out). These mechanisms are well understood in the art. Supporting these mechanisms can involve more intelligence in the SDN Controller and additional tables in the switches.

Figure 4A:
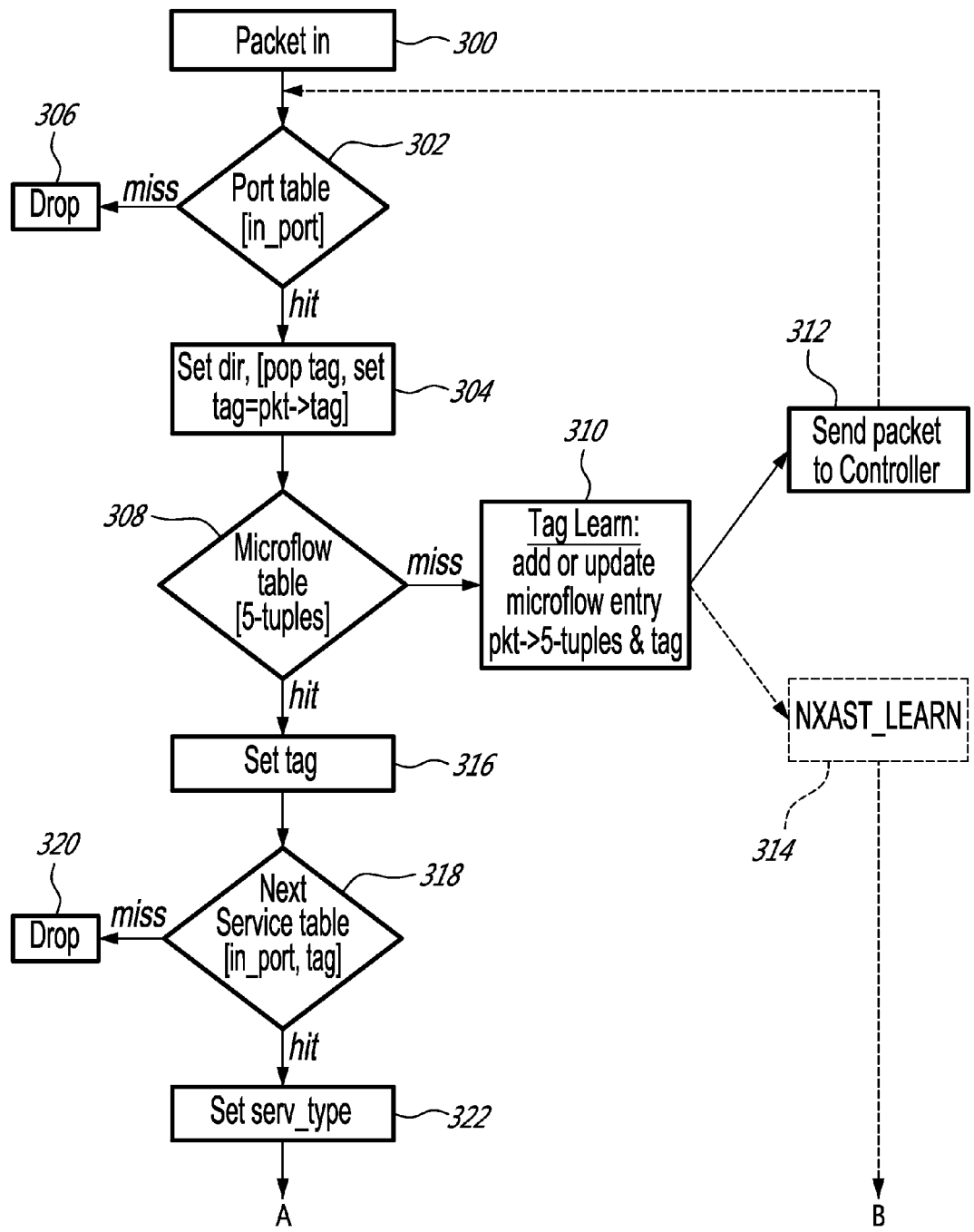
FIG. 4a is a flow chart according to a first embodiment of the present invention.
Figure 4A:
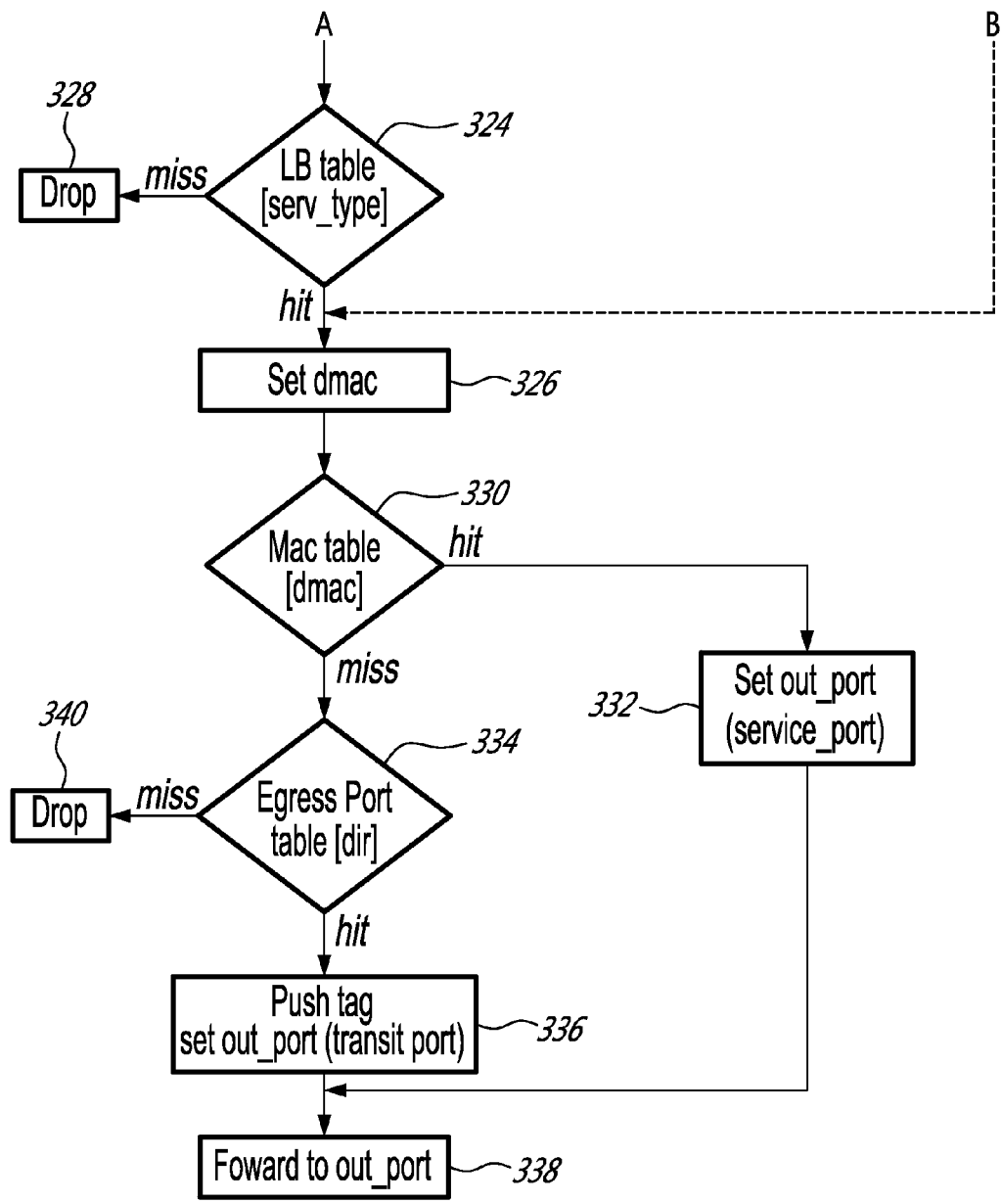

FIG. 4a illustrates an example method for processing packets by a forwarding element. Five separate tables are used in this exemplary embodiment.

Port table: There is one entry per port. A port can either be connected to another switch, either physical or virtual or be connected to a service (e.g. via a service port).

Microflow table: Contains entries for active flows. Learned entries for the correlation are inserted in this table. This table logically maps a flow to a service chaining tag.

Next Service table: This table maps service tag to next service type based on the received port.

Load Balancing table: This table is a group table. Each entry represents a service type. Each bucket represents an instance of a service.

MAC table: This table is used to determine if the packet has to be sent to a VM on the same server or be sent out to another server.

The processing of a packet with respect to these tables can be referred to as a "hit" or a "miss". In other words, there can be a successful match (a hit) when looking up the packet in a table, or no match exists in the table (a miss). Parameters extracted from the packet can be compared with entries stored in the table(s).

Referring again to FIG. 4a, the process begins when a packet is received by a port on the forwarding element (step 300) and its protocol headers are parsed and this information is stored in the packet context. As defined in the OpenFlow specification, pipeline processing starts at the first OpenFlow table.

The first table to be considered is the Port table (step 302). The Controller installs an entry in this table for each configured ingress port. A packet can either be received by a transit port (from another switch) or by a service port (from a service running in a VM). All hits in the Port table will result in an action (step 304) that will set a direction bit in the metadata (upstream/downstream) and instruct the packet to be sent to the second table (OFPIT_GOTO_TABLE). Packets coming from another switch, over a transit port, will already contain a service chain tag and, in this case, the Port table entries corresponding to a transit port will contain an additional action to "pop" the tag (i.e. strip and remove the tag from the packet) and store it in the metadata. In an optional embodiment, if the tag is unique, the direction could be implied by the tag itself. In the case where a pop action is applied on a packet that does not contain a tag, this may result in an undetermined behavior. For this reason, it is suggested to add a match on the Ethertype for all the entries in this table that correspond to the tunnel type (for example, 0x8847 for MPLS). Any packet which is received from a non-configured port will result in a miss and be dropped (step 306).

The second table to be looked-up is the Microflow table where the 5-tuple derived from the packet (source IP address, destination IP address, source port, destination port and protocol) is compared to the table entries (step 308). On startup, the forwarding element initially will not have any entries in this table. New flows can be learned and added to the table.

In the case where the flow has not been previously learned (e.g. a table lookup miss), a new entry must be stored in the Microflow table for correlation purposes (step 310). In OpenFlow this can be achieved by using an action of type OFPAT_OUTPUT to the logical port OFPP_CONTROLLER which will send the packet to the Controller for further processing (step 312). The Controller will then receive the packet, analyze it and then send an OFPT_FLOW_MOD to the forwarding element in order to program the learned flow (the tag is stored in the metadata of this entry). It is possible for the Controller to send back the packet to the forwarding element for continuing its processing in the data path (an OFPT_PACKET_OUT with an action of type OFPAT_OUTPUT with argument OFPP_TABLE is then used to re-inject the packet in the forwarding pipeline). Note that the idle_timeout value of a flow entry will be reset by the forwarding element whenever a flow matches an entry. If ever the idle_timeout gets to zero because the flow is inactive then the flow will be removed and an event will be sent to the Controller.

This method can introduce delays in the processing of the packets of a flow until the flow is properly programmed (the system might have one or more packets queued up in the Controller that are part of the same flow) and may also bring packet re-ordering issues. For this reason, an alternative method can be employed that uses an OpenFlow extension for executing a learn action in the data path (see NXAST_LEARN). This allows the switch to learn a new tag on-the-fly, without having to contact the controller, and to insert a new entry associated with the tag into the Microflow table (step 314). Once the flow is learned, the packet is directly re-injected into the forwarding pipeline and moves to the MAC table.

A packet that is received from a VM or a service will most likely result in a successful lookup in the Microflow Table (step 308). When an entry is matched, the action specified (OFPIT_WRITE_METADATA) will set the metadata to store the service chain tag that was previously learned with the first packet of this flow as was discussed above (step 316).

Processing of the packet will continue to the next table which is the Next Service table (step 318). It is still possible that a packet from a VM generates a "miss" lookup (for example, the packet could take too long to be processed by the service) and the packet will then be dropped by the Controller (step 320) since there is no tag included in the packet. A service that injects a new packet in the forwarding element is assumed to do so in coordination with the Controller in order to install the proper rules.

The Next Service Table contains one entry per tag per service port, and based on the port will determine which service type is next in the service chain. When an entry is matched, the action is to set the service type (step 322). The final action of this entry/table will then forward the packet (OFPAT_GROUP) to the Load Balancing table based on the service type.

The Load Balancing group table is used to determine which particular instance of the given service type that the packet should be forwarded to (step 324). As previously discussed, each service type corresponds to a table group ID of type OFPGT_SELECT where each bucket corresponds to a service instance. The action associated with the bucket will set the destination MAC address corresponding to the next service instance (step 326). It should be noted that there is one group entry per direction (upstream and downstream). A miss on the load balancing table is still possible, and the packet will be dropped (step 328).

Using an OFPIT_GOTO_TABLE, the packet will be analyzed by the MAC table to determine if the next hop for the packet is local or remote (step 330). There is one entry in this table per possible local destination. A successful lookup will simply send the packet to a local VM, action of type OFPAT_OUTPUT where port is the port attached to the VM (step 332).

A failed lookup (miss) will send the packet to the Egress Port table (step 334) to set the output port based on the direction bit and to "push" the service chain tag (as is stored in the metadata) in the packet (step 336). The packet is then sent out to the transit port (OFPAT_OUTPUT) (step 338). A miss in the Egress Port table will result in the packet being dropped (step 340).

Those skilled in the art will appreciate that the order of the table lookups can be modified without affecting the scope of the invention. In some embodiments, some of the table lookups shown in FIG. 4a can be omitted from the process without affecting the scope of the invention.

Figure 4B:
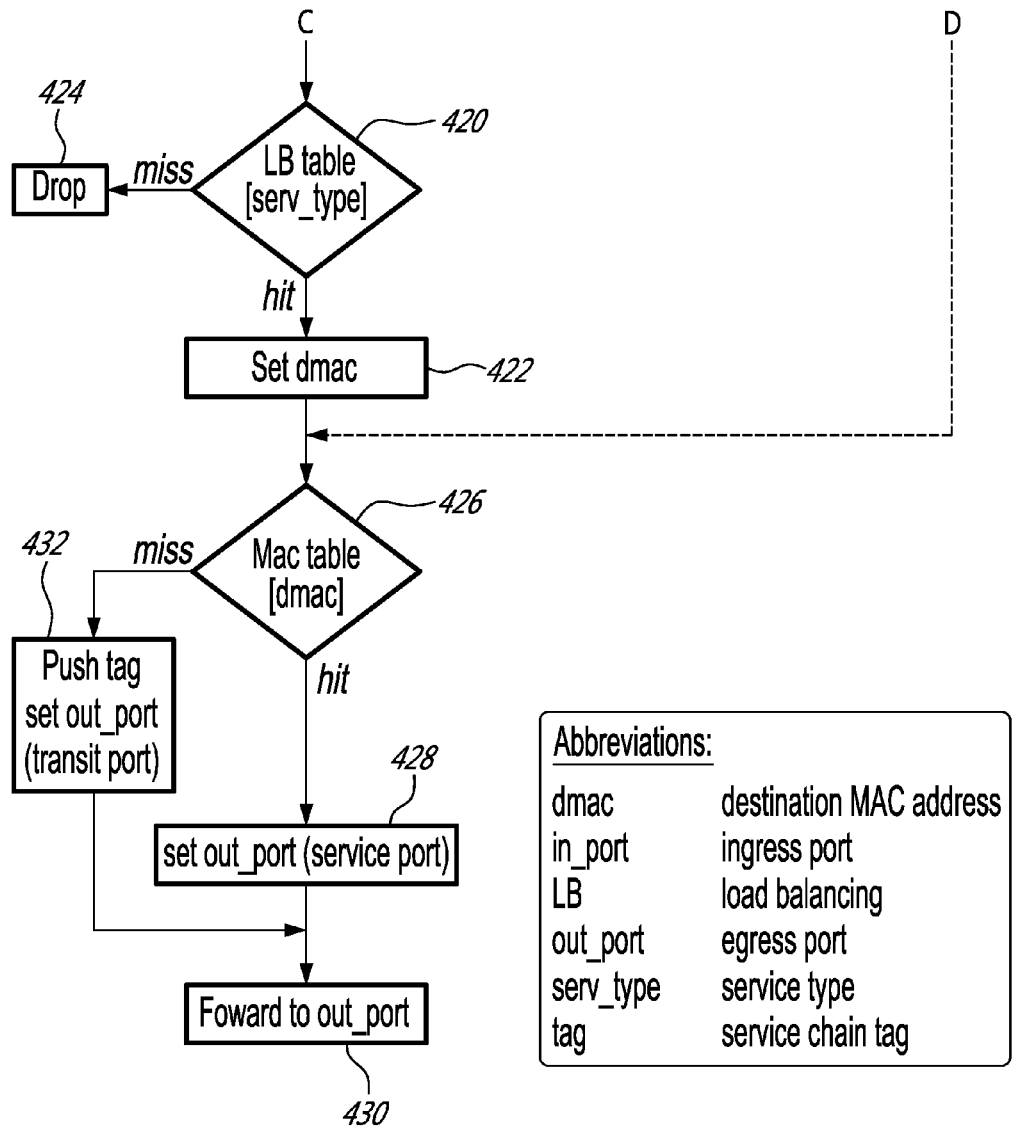
FIG. 4b is a flow chart according to a second embodiment of the present invention.

FIG. 4b illustrates another example method for packet steering by a forwarding element. The process begins by receiving a packet on an ingress port (step 400). If the received packet has an associated tag, the tag is removed from the packet (step 402).

The first table to be considered is the Microflow table. The 5-tuple of the packet is extracted and looked-up in the Microflow table (step 404). If there is an entry corresponding to the packet 5-tuple stored in the Microflow table, the packet is correlated with the identified flow and associated service chain (step 406). The corresponding service chain identifier is added to the metadata tag associated with the packet.

In the case where there is no entry corresponding to the packet 5-tuple stored in the Microflow table, a new entry is learned and stored in the Microflow table (step 408). As discussed with respect to FIG. 4a, the packet can optionally be sent out to the controller (step 410) for the flow and tag learning. Alternatively, the forwarding element can learn the flow independently without involving the control and can create a new entry in the Microflow table (step 412). An extension can be provided to the forwarding element that allows an action of inserting new entries in a table stored in the forwarding element. The learning action is essentially filling a template, by the switch, using some header fields from the packets (both for the new entry match fields and the actions value) along with some fixed/static values to create a new entry in a specific table. In other words, the switch can extract bits from the packet and store them as a new table entry.

Following a successful hit in the Microflow table lookup (step 404) and setting the tag with the appropriate service chain identifier (step 406), the packet proceeds to the Next Service table for processing. A next service type for the packet is determined by using the packet tag and the ingress port the packet was received on (step 414). The tag indicates the service chain that the packet has been assigned to, and the ingress port indicates the last service that has been applied to the packet. A successful lookup in the Next Service table results in setting the service type for the packet that can be stored in the metadata associated with the packet (step 416). A miss in the Next Service table results in the packet being dropped (step 418).

The Load Balancing table selects an instance of the next service based on the service type (step 420). The instance can be selected from a plurality of instances of the next service available for packet processing. The selection of the particular instance of the next service can be made considering a variety of other conditions in addition to the service type. For example, a packet parameter such as the source or destination IP address can be used to select the instance of the next service. All packets in a given flow can be directed to the same instance of the next service type to preserve flow affinity. Non-packet parameters can also be considered in determining the instance of the next service (e.g. I/O interface, time of day). A load balancing algorithm can optionally be used to distribute packet traffic amongst a number of instances of the same service.

A successful lookup in the Load Balancing table resulting in setting the destination MAC address of the packet to the address of the selected instance of the next service (step 422). A miss in the Load Balancing table results in the packet being dropped (step 424).

The packet subsequently proceeds to the MAC table to lookup the destination MAC address (step 426). A hit in the MAC table indicates that the destination address is local and results in selecting the egress port (service port) associated with the address of the instance of the next service (step 428) and forwarding the packet on that egress port (step 430). A miss on the MAC table indicates that the destination address is non-local. In this case, the service chain tag is appended to the packet and the egress port (transit port) is selected in accordance with the address of the instance of the next service (step 432). The packet is then forwarded on the egress port (step 430).

Embodiments of the present disclosure utilize open interface which allows the system to be independent of the Controller software and switch hardware. The system provides support for a large number of services and service instances. Improved flexibility for how the operator can configure his network is supported, based on multiple policies, subscribers, applications, service ordering, etc. The system can support detection of content and bypass of inline services for trusted and recognized flows. The system can also support service chaining across multiple domains (access, core, cloud, etc.).

Figure 5A:
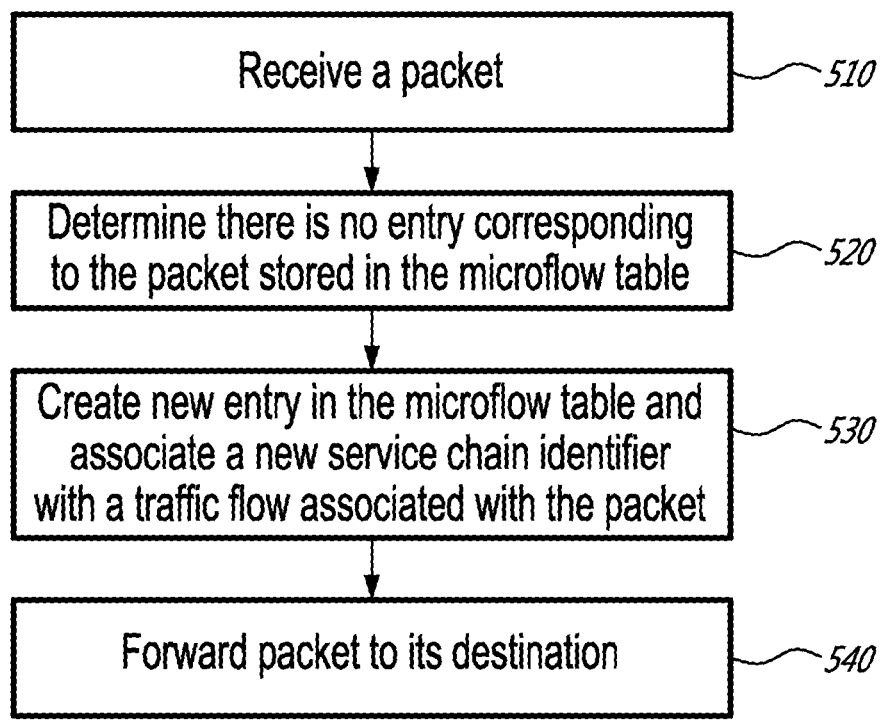
FIG. 5a illustrates a method for processing a first packet in a traffic flow.

FIG. 5*a* is a flow chart illustrating a method for processing a first packet received in a traffic flow. The method begins by receiving a packet by a switch (block 510). The received packet may include a tag indicating a service chain it is associated with. If the packet has an associated service chain identifier (ID), it can be removed from the packet. It is determined that there is no entry in the microflow table corresponding to the received packet (block 520). A new entry is created and added to the microflow table (block 530). The new entry associates a new service chain ID with a traffic flow that is associated with the received packet. Subsequent packets in this traffic flow can be correlated with the traffic flow and the service chain ID via this update to the microflow table. The received packet is forwarded to its destination (block 540). Optionally, the service chain ID can be added to the packet prior to it being forwarded to its destination. If the output port for the destination is a transit port, the service chain ID can be added to the packet. If the output port for the destination is a service port, the service chain ID is not added to the packet.

In an optional embodiment, after creating the new entry in the microflow table, the switch can notify the controller (or other network elements) of the new entry and a microflow table update can be pushed to other switches in the service chain. Optionally, the microflow table update can be propagated only to switches that are upstream or downstream in the service chain as applicable.

Figure 5B:
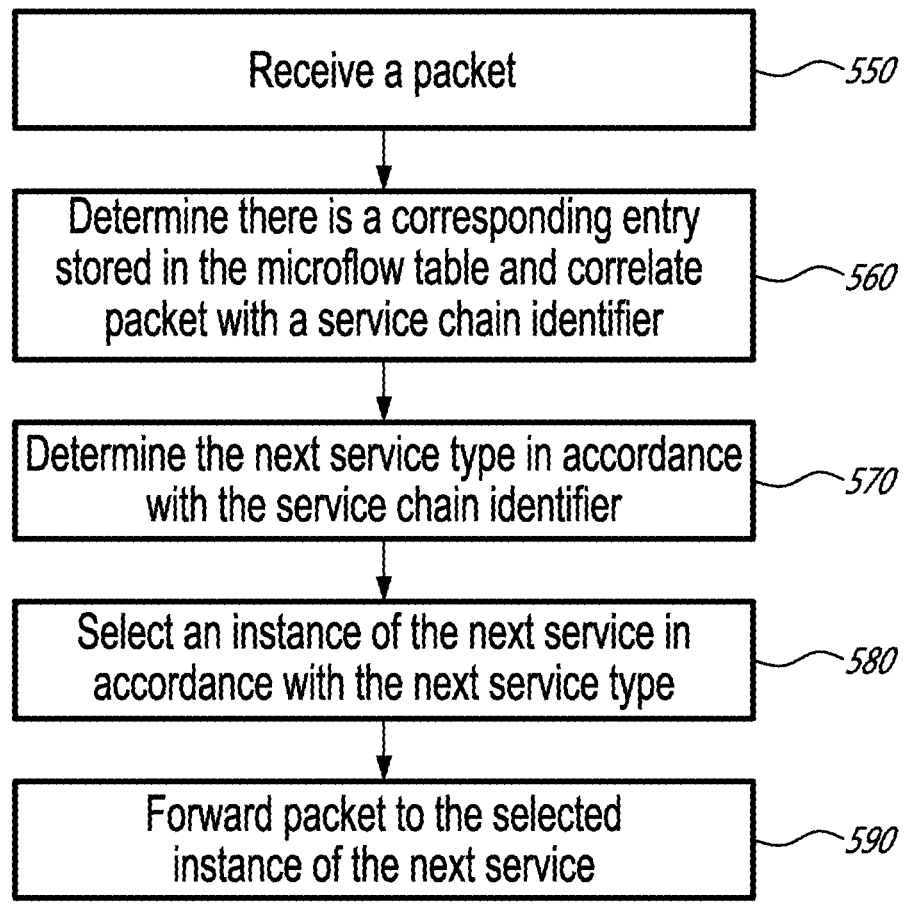
FIG. 5b illustrates a method for steering packet traffic.

FIG. 5*b* is a flow chart illustrating a method for steering packet traffic. The method begins by a forwarding element receiving a packet (block 550). The forwarding element can be a switch, a virtual switch or any other routing entity. The received packet may include a service chain tag indicating a service chain associated with the packet. If the packet has an associated service chain tag, it can be removed from the packet. It is determined that there is an entry in the microflow table corresponding to the packet (block 560). The received packet is correlated and associated with the corresponding service chain ID as indicated by the entry in the microflow table. The service chain ID can be stored in metadata associated with the packet.

A next service type for the packet is determined in accordance with the service chain ID (block 570). The next service type can also be determined in accordance with the ingress port that the packet was received on. An instance of the next service that the packet should be steered towards is determined in accordance with the next service type (block 580). The instance can be selected form a plurality of instances of the next service. The determination of the particular instance of the next service can also be determined in accordance with the traffic flow the packet belongs to, a packet parameter (e.g. one or more of the 5-tuple parameters), a non-packet parameter (e.g. time of day), a load balancing algorithm, or any other appropriate parameter that guarantees flow affinity. This insures that all packets in a given flow traverse the same service instance path for the lifetime of the traffic flow. A load balancing algorithm can be used to distribute the packet traffic amongst a plurality of instances of the next service.

The packet is then forwarded to the selected instance of the next service (block 590). A destination address (e.g. MAC address) for the packet can be determined and set in accordance with the selected instance of the next service. An egress port can be selected in accordance with the selected instance of the next service. Optionally, the service chain ID can be attached, or added, as a service chain tag to the packet prior to it being forwarded to its destination. The service chain tag can be added in response to determining that the egress port is a transit port, for forwarding the packet to another switch.

FIG. 6 is a block diagram illustrating an example switch or forwarding element 600 according to embodiments of the present invention. The switch 600 includes a processor 602, a memory or instruction repository 604 and a communication interface 606. The communication interface 606 can include at least one input (ingress) port and at least one output (egress) port. The memory 604 contains instructions executable by the processor 602 whereby the switch 600 is operable to perform the various embodiments as described herein. The memory 604 can store a microflow table and other flow tables as have been described herein. The switch 600 can be a virtual switch implemented on a hypervisor and/or underlying physical hardware.

Switch 600 is configured to receive a packet on an ingress port of the communication interface 606. Responsive to the processor 602 determining that there is an entry corresponding to the received packet stored in a flow table, the packet is correlated with a service chain identifier. The processor 602 determines a next service type for the packet in accordance with the service chain identifier and the ingress port on which the packet was received. The processor 602 selects an instance of the next service in accordance with the next service type. The instance of the next service can be selected in accordance with other additional factors, including: a load balancing algorithm for distributing packet traffic between a plurality of instances of the next service, a parameter associated with the packet, and/or a non-packet parameter. The switch 600 forwards the packet to the selected instance of the next service over the communication interface 606. The switch 600 can select an egress port of the communication interface 606 in accordance with the selected instance of the next service. In response to determining there is no entry corresponding to the packet stored in a flow table, the processor 602 can create a new entry in a microflow table stored in the memory 604. The processor 602 can assign a new service chain identifier to a traffic flow associated with the packet.

In another embodiment, switch 600 can include a microflow table module for correlating the packet with a service chain, a next service table module for determining a next service type for the packet in accordance with the service chain and the ingress port, and a load balancing table module for selecting an instance of the next service in accordance with the determined next service type.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for steering packet traffic comprising:
receiving a packet on an ingress port;
responsive to determining there is an entry corresponding to the packet stored in a microflow table, correlating the packet with a service chain identifier;
determining a next service type for the packet in accordance with the service chain identifier and the ingress port;
selecting an instance of the next service in accordance with the determined next service type and a load balancing algorithm distributing packet traffic between a plurality of instances of the next service; and
forwarding the packet to the selected instance of the next service.

2. The method of claim 1, further comprising, responsive to determining that the received packet has an associated service chain tag, removing the service chain tag from the packet.

3. The method of claim 1, further comprising storing the service chain identifier in metadata associated with the packet.

4. The method of claim 1, wherein the instance of the next service is selected further in accordance with at least one parameter associated with the packet.

5. The method of claim 1, wherein the instance of the next service is selected further in accordance with a non-packet parameter.

6. The method of claim 1, further comprising setting a destination address of the packet in accordance with the selected instance of the next service.

7. The method of claim 1, further comprising selecting an egress port in accordance with the selected instance of the next service.

8. The method of claim 7, wherein, responsive to determining that the egress port is a transit port, attaching a service chain tag to the packet.

9. A method for steering packet traffic comprising:
receiving a packet on an ingress port;
responsive to determining there is no entry corresponding to the packet stored in a microflow table, creating a new entry in the microflow table;
correlating the packet with the new entry in the microflow table and a service chain identifier;
determining a next service type for the packet in accordance with the service chain identifier and the ingress port;
selecting an instance of the next service in accordance with the determined next service type; and
forwarding the packet to the selected instance of the next service.

10. The method of claim 9, further comprising assigning a new service chain identifier to a traffic flow associated with the packet.

11. The method of claim 9, wherein the instance of the next service is selected in accordance with a load balancing algorithm distributing packet traffic between a plurality of instances of the next service.

12. The method of claim 9, wherein the instance of the next service is selected in accordance with at least one of a packet parameter or a non-packet parameter.

13. A switch comprising a communication interface, a processor, and a memory, the memory containing instructions executable by the processor whereby the switch is operative to:
receive a packet on an ingress port of the communication interface;
responsive to determining there is an entry corresponding to the packet stored in a microflow table, correlate the packet with a service chain identifier;
determine a next service type for the packet in accordance with the service chain identifier and the ingress port;
select an instance of the next service in accordance with the next service type and a load balancing algorithm distributing packet traffic between a plurality of instances of the next service; and
forward the packet to the selected instance of the next service by the communication interface.

14. The switch of claim 13, further operative to, responsive to determining that the received packet has an associated service chain tag, remove the service chain tag from the packet.

15. The switch of claim 13, wherein the instance of the next service is selected further in accordance with at least one parameter associated with the packet.

16. The switch of claim 13, further operative to select an egress port of the communication interface in accordance with the selected instance of the next service.

17. The switch of claim 16, further operative to attach a service chain tag to the packet in response to determining that the egress port is a transit port.

18. A switch comprising a communication interface, a processor, and a memory, the memory containing instructions executable by the processor whereby the switch is operative to:
receive a packet on an ingress port of the communication interface;
create a new entry in a microflow table in response to determining there is no entry corresponding to the packet stored in the microflow table;
correlate the packet with the new entry in the microflow table and a service chain identifier;
determine a next service type for the packet in accordance with the service chain identifier and the ingress port;

select an instance of the next service in accordance with the determined next service type; and forward the packet to the selected instance of the next service.

19. The switch of claim 18, wherein creating a new entry in the microflow table includes assigning a new service chain identifier to a traffic flow associated with the packet.

20. The switch of claim 18, wherein the instance of the next service is selected in accordance with a load balancing algorithm distributing packet traffic between a plurality of instances of the next service.

21. The switch of claim 18, wherein the instance of the next service is selected in accordance with a load balancing algorithm distributing packet traffic between a plurality of instances of the next service.

22. A forwarding element comprising:

an ingress port for receiving a packet;

a microflow table module for correlating the packet with a service chain;

a next service table module for determining a next service type for the packet in accordance with the service chain and the ingress port;

a load balancing table module for selecting an instance of the next service in accordance with the determined next service type and a load balancing algorithm distributing packet traffic between a plurality of instances of the next service; and an egress port for forwarding the packet towards a destination address associated with the selected instance of the next service.

* * * * *